United States Patent Office 3,536,614
Patented Oct. 27, 1970

3,536,614
METHOD OF GEL CHROMATOGRAPHY
Alvin J. Frisque, La Grange, and Jerilynn S. Resan, Chicago, Ill., assignors to Nalco Chemical Company, Chicago, Ill., a corporation of Delaware
Filed June 9, 1969, Ser. No. 831,502
Int. Cl. B01d *15/08*
U.S. Cl. 210—31    4 Claims

ABSTRACT OF THE DISCLOSURE

Polymer fractions in terms of molecular weight may be separated using a sieving gel which is a highly cross-linked polymer based on water soluble adducts of methylene bisacrylamide.

---

Figure 1:
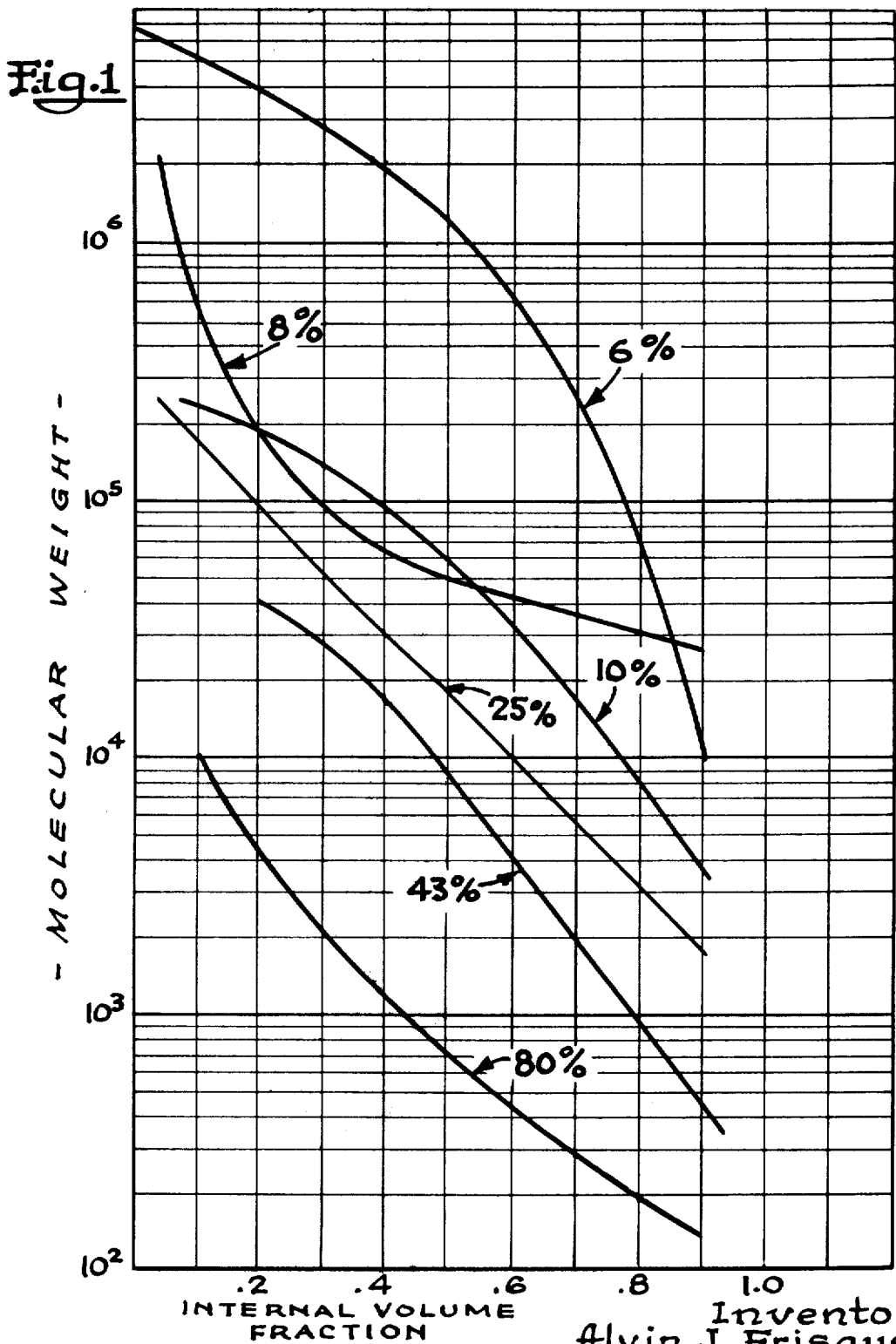

This invention relates to highly water insoluble sieving gels and beds made therefrom capable of fractionating water soluble polymers with molecular weights in the range of $10^2$–$10^7$. The gel of the present invention is water compatible in that the discrete solid polymer particles (each a substantially spherical bead or grain) internally trap water.

A sieving gel bed is deemed herein to be a gel filter medium serving, when present as a distinct bed or mass in a container, to separate large molecules from smaller molecules poured onto the gel filter bed. The technology is known as gel chromatography.

Briefly, a polymeric system of diverse molecular weight, containing both large and small molecules in solution, as to which separation by molecular weight is to be performed, is presented to the sieving gel immersed in an aqueous medium. The larger molecules, incapable of penetrating the gel beads, remain in solution and move through the outer spaces between the gel grains or beads, whereas the smaller molecules penetrate the gel grains which themselves are porous and contain an internal solvent which under the present invention is water or other polar liquid.

In other words given a gel bed of a certain height, the larger molecules in the ideal circumstance will be concentrated at the bottom, and the lighter ones tend to penetrate the gel grains at a higher level. Another picture or model is that the larger molecules stay outside the gel grains, in the outer solvent, whereas the smaller molecules are trapped in the interior solvent (water) inside the porous gel grains. The polymeric fractions may be collected by elution liquid displacement as described in U.S. Pat. No. 3,369,007. The greater the porosity of the gel bed, the greater is the efficiency in separating the polymers of greater molecular weight.

The sieving gel of U.S. Pat. No. 3,369,007 is a copolymer of an alkylidene-bisacrylamide monomer and an ethylenic monomer. We have found that a superior sieving gel, a more rigid or dense one, may be produced by polymerizing highly water soluble adducts of the bisacrylamide which itself is only slightly water soluble. Methylene bisacrylamide, for example, is water soluble only to the extent of 3% by weight (20° C.) whereas the monomers used for emulsion polymerization under the present invention are at least ten times more soluble, and hence there can be 100% cross-linker in the course of forming the polymers, compatibly surrounding water droplets, to complete the discrete, spherical gel grains or beads.

Thus the sieving gel of the present invention is characterized by rigid grains, more so than the product of U.S. Pat. No. 3,369,007, which is to say that the polymeric beads or grains of the present invention are less elastic. Resultantly, the gel bed is less compacted, or in other words greater macroporosity is achieved characterizing high flowability or permeability, and therefore increased efficiency in fractionating higher molecular weight polymers compared to the gel bed in U.S. Pat. No. 3,369,007.

It is therefore the primary object of the present invention to produce a water-compatible sieving gel of sufficient macroporosity to separate polymers in the molecular weight range of $10^2$–$10^7$, not heretofore achieved with such gels, and an object related thereto is to attain a high degree of macroporosity by producing beads or grains that are relatively rigid in nature. Another object of the present invention is to achieve such rigid structures by producing the gel polymer from highly water soluble monomers capable of developing a high degree of cross-linking.

Figure 2:
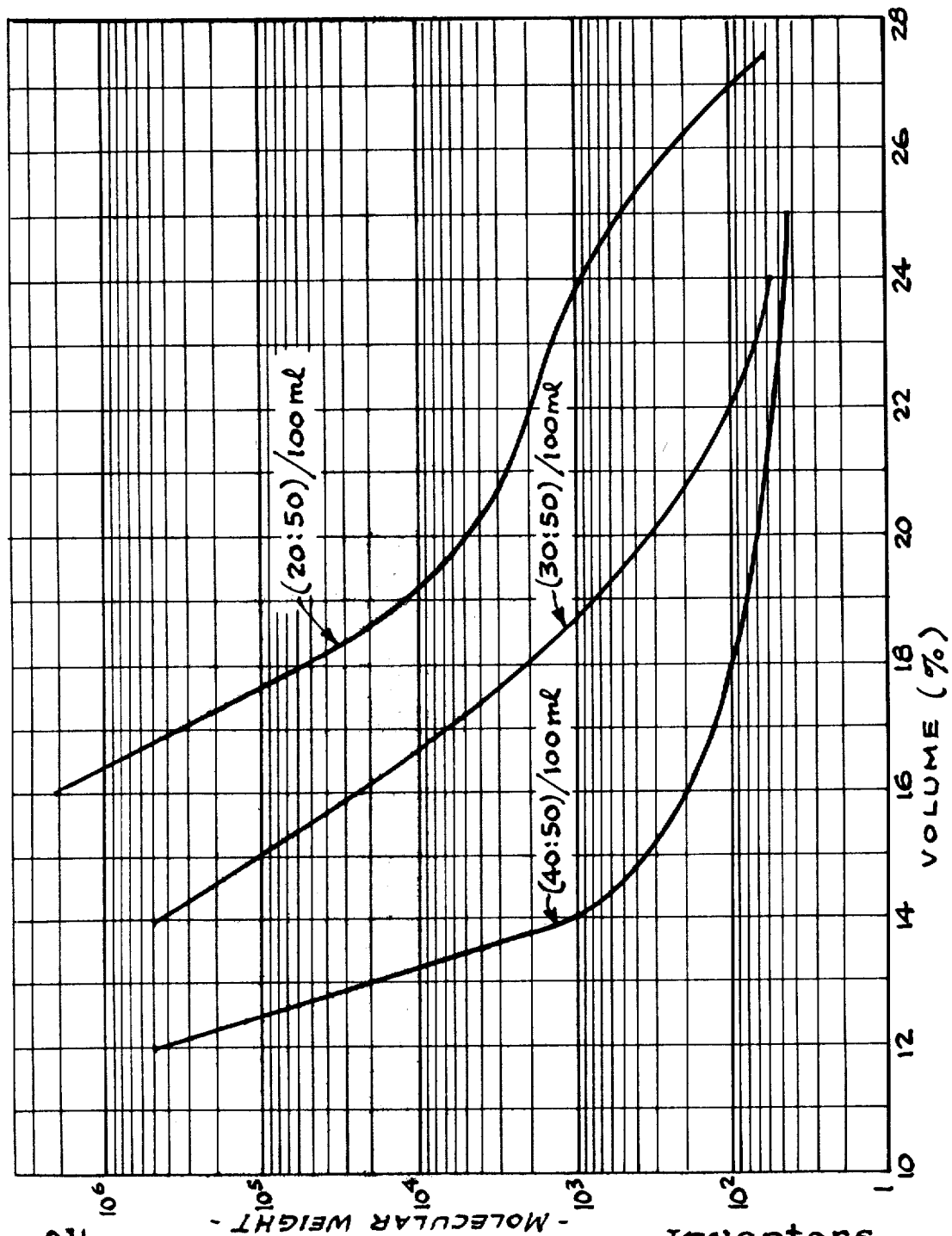

In the drawings:

FIG. 1 is a graph on logarithmic scale showing the separation of polymer fractions attained under the present invention, using a homopolymer gel; and FIG. 2 is a graph on logarithmic scale showing the separation of polymer fractions obtained under the present invention, using a copolymer gel.

The structural formula for the water soluble adducts of the present invention may be written as:

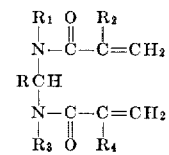

where:

R is selected from the group consisting of H, a $C_1$–$C_6$ alkane group, —COOH, $CH_2CH_2O$—, and $$CH_2CH_2CH_2O—$$

$R_1$ and $R_3$ are selected from the group consisting of —$CH_2OH$, —COOH, and —$HSO_4$; and $R_2$ and $R_4$ are selected from the group consisting of H and $CH_3$.

Preferably:

R=H
$R_1$=—COOH
$R_2$=H
$R_3$=H
$R_4$=H

One method of attaining a water soluble adduct is to react methylene bisacrylamide with either formaldehyde or formic acid, yielding:

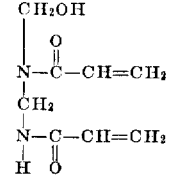

(formaldehyde adduct: 40 parts soluble per 100 parts solvent)

or

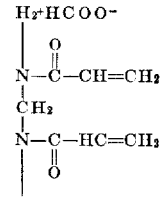

(acid adduct: 80 parts soluble per 100 parts solvent).

Either adduct may be polymerized by itself (100% "cross-linker") or it may be copolymerized with an ethylenic (mono functional vinyl) compound having the formula $RCH=CH_2$, such as acrylamide, provided the adduct monomer is at a higher level than would be soluble as the non-adducted form, that is, at the same temperature as previously stated, this would be more than 3 grams per 100 ml. solvent.

In producing the formaldehyde adduct, it is only necessary to react the bisacrylamide and formaldehyde on a mole-to-mole ratio in a basic solution while heating. The acid adduct may be formed by reacting the bisacrylamide with the formic acid or formic acid and water.

EXAMPLE 1

Methylene bisacrylamide, 160 grams, is dissolved in 240 ml. of formic acid in the presence of 20 ml. of an oleate emulsifier such as Tween 80, producing the acid adduct.

A catalyst solution is prepared consisting of 20 grams of $(NH_4)_2S_2O_8$ dissolved in 40 ml. of water.

A reaction vessel containing 1500 ml. of heptane and 80 ml. of Span 80 is purged with $N_2$ for 30 minutes, stirring constantly at a speed sufficient to disperse the aqueous phase as small drops within the organic phase. The monomer and catalyst solutions are then added in a 5:1 ratio. A homopolymer of the adduct is formed, cross-linking taking place between adjacent vinyl groups.

The resultant gel is cured at a temperature of 50° C. for about two hours. After cooling, the product is poured through a basket centrifuge and washed extensively with alcohol followed by a water wash. Size distribution is selected by wet sieving.

EXAMPLE 2

Methylenebisacrylamide, 90 grams, is dissolved in 240 ml. of formaldehyde solution at 50° C. and a pH of 8–10 in the presence of 20 ml. of an oleate emulsifier such as Tween 80, producing the formaldehyde adduct.

A catalyst solution is prepared consisting of 20 grams of $(NH_4)_2S_2O_8$ dissolved in 40 ml. of water.

A reaction vessel containing 1500 ml. of heptane and 80 ml. of Span 80 is purged with $N_2$ for 30 minutes, stirring constantly at a speed sufficient to disperse the aqueous phase as small drops within the organic phase. The monomer and catalyst solutions are then added in a 5:1 ratio. A homopolymer of the adduct is formed, cross-linking taking place between adjacent vinyl groups.

The percent gel is expressed as grams/100 ml. of solvent, which is the inner water content of the gel beads in this instance. Gels made from the formaldehyde adduct range from 3% to 40%; from the acid adduct, 3% to 80%; for an adduct and acrylamide (copolymer), 3% to 150%. Mesh sizes range from 50 to 400, controlled by commonly known emulsion technology.

FIG. 1 presents laboratory gel chromatography data showing attainment of molecular sieving in the range of $10^2$–$10^7$, using gels of different percent but made entirely from the acid adduct of Example 1, 100% cross-linker.

The lower curve, FIG. 1, shows that a gel made by polymerizing 80 grams of the water soluble bisacrylamide ("bis") adduct per 100 ml. solvent (80%) fractionates polymers between $10^1$ and $10^4$ molecular weight (M.W.); the upper curve, that a 6% gel made by polymerizing 6 grams of "bis" per 100 ml. solvent fractionates polymers between $10^4$ and $10^7$ M.W.

The abscissa of FIG. 1 represents the fraction of the internal volume of the gel particle available to the molecular weight shown. For example, with the 80% gel 0.7 of the internal volume is available to M.W. 300 and 0.1 is available to M.W. 10,000; for the 6% gel, 0.9 of the internal volume is available to M.W. about 10,000, and only about 0.1 is available to M.W. 5,000,000. Water compatible acrylamide gels commercially available exclude polymers of 300,000 M.W., which are the approximate exclusion limits of a 25% gel of the present invention.

Among the commercial water compatible sieving gels, agarose, which has the highest permeability limit, excludes a substantial fraction of $2 \times 10^6$ M.W. polymers, even at a solids content (gel) as low as 2%. On the other hand, the present 6% gel, FIG. 1, completely includes this fraction.

FIG. 2 shows molecular separations using a copolymer of acrylamide and the formaldehyde adduct of "bis," there being three different ratios of total monomer content: "bis" adduct monomer, namely, 40:50, 30:50 and 20:50 per 100 ml. of solvent (water). It may be mentioned that in designating a 40:50 ratio, for example, this means that per 100 ml. polar solvent there are 40 grams of gel (40%) of which 50% is the "bis" adduct, and 50% is acrylamide. The lowest acceptable limit appears to be more than 3% by weight of the "bis" adduct in the gel polymer, and it may be 100%.

It will be seen from the foregoing that under the present invention we afford a water compatible sieving gel capable of separating fractions of molecular weight nearly $10^7$ and we accomplish this by having resort to gel polymers which include a relatively high amount of cross-linker in the form of a water soluble adduct of methylene bisacrylamide.

Hence while we have disclosed preferred embodiments of our invention it is to be understood that these are capable of variation and modification.

We claim:

1. A water compatible sieving gel selected from the group consisting of (1) a homopolymer of a water soluble bisacrylamide monomer having the formula

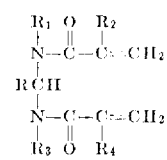

where:

R is selected from the group consisting of H, a $C_1$–$C_6$ alkane group, —COOH, $CH_2CH_2O$—, and $CH_2CH_2CH_2O$—;

$R_1$ and $R_3$ are selected from the group consisting of —$CH_2OH$, —COOH, and —$HSO_4$; and $R_2$ and $R_4$ are selected from the group consisting of H and $CH_3$;

and (2) a copolymer of said bisacrylamide and a vinyl monomer standing in the ratio of greater than 3:97 grams per 100 ml. polar solvent.

2. A gel according to claim 1 in which R, $R_2$, $R_3$ and $R_4$ are H, $R_1$ is —$CH_2OH$, and the vinyl monomer is acrylamide.

3. A gel according to claim 1 in which R, $R_2$, $R_3$ and $R_4$ are H, $R_1$ is —COOH and the vinyl monomer is acrylamide.

4. A method of gel chromatography in which the gel bed is represented by gel particles selected from the group consisting of (1) a homopolymer of a water soluble bisacrylamide monomer having the formula

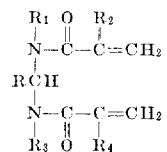

where:

R is selected from the group consisting of H, A$C_1$–$C_6$ alkane group, —COOH, $CH_2CH_2O$—, and $CH_2CH_2CH_2O$—

$R_1$ and $R_3$ are selected from the group consisting of —$CH_2OH$, —$COOH$, and —$HSO_4$; and
$R_2$ and $R_4$ are selected from the group consisting of H and $CH_3$;

and (2) a copolymer of said bisacrylamide and a vinyl monomer standing in the ratio of greater than 3:97 grams per 100 ml. polar solvent.

References Cited

UNITED STATES PATENTS 3,298,925  1/1967  Mosbach _____ 210—31 X

J. L. DECESARE, Primary Examiner

U.S. Cl. X.R.

210—198; 260—29.6